United States Patent [19]

Kern

[11] 3,985,066

[45] Oct. 12, 1976

[54] SINGLE POINT MEANS FOR SLOTTER ADJUSTMENT

[75] Inventor: William M. Kern, New York, N.Y.

[73] Assignee: S&S Corrugated Paper Machinery Co., Inc., Brooklyn, N.Y.

[22] Filed: May 15, 1975

[21] Appl. No.: 577,912

[52] U.S. Cl. .............................. 93/58.2 R; 83/332; 83/665; 83/699

[51] Int. Cl.$^2$ ...................... B31B 1/22; B23D 1/00; B26D 1/56

[58] Field of Search ............. 93/58.2 R, 58.1, 58 R, 93/59 R, 49 R; 83/699, 332, 665, 671

[56] References Cited

UNITED STATES PATENTS

| | | | |
|---|---|---|---|
| 1,235,293 | 7/1917 | Daven | 83/332 X |
| 3,067,643 | 12/1962 | Ward, Jr. | 83/332 X |
| 3,466,982 | 9/1969 | Sullivan | 83/332 X |

*Primary Examiner*—Othell M. Simpson
*Assistant Examiner*—Horace M. Culver
*Attorney, Agent, or Firm*—Ostrolenk, Faber, Gerb & Soffen

[57] ABSTRACT

A single point adjusting means for a rotary slotter used to transform sheets into box blanks is constructed so that each head is constructed of two sections normally locked together by a spring clutch. Each section carries a slotter blade and one section is keyed directly to the main drive shaft. The other section is selectively operable by a pneumatic power means between a cutting position wherein the spring clutch is engaged and an adjusting position wherein it is locked to the machine frame at an angular indexing position. At this time rotation of the main shaft will move the head section keyed thereto while the other section remains fixed thereby adjusting the relative angular positions of the slotter blades.

Blade changing is facilitated by providing spring clamp means and a pneumatic actuated means for releasing the blade clamp.

14 Claims, 6 Drawing Figures

SINGLE POINT MEANS FOR SLOTTER ADJUSTMENT

This invention relates to automatic box making apparatus in general and more particularly relates to means for adjusting slotter blades.

U.S. Pat. No. 2,982,189 issued May 2, 1961, to A. F. Shields for Power Driven Adjusting Means For Slotting, Scoring, Creasing, and Slitting Machine, describes automatic machinery for producing flattened glued boxes from sheets of corrugated board having transverse scores separating the side panels from the top and bottom flaps. The box making machinery provides longitudinal scores between side panels as well as longitudinal slots between the flaps. Each time a box size is changed it is necessary to change the transverse positions of the slotting ans scoring heads. In addition, it is necessary to change the angular positions of the slotting blades.

In the prior art, for the most part, angular adjustment of the slotter blades was done manually and required excessive time because of the many clamping screws that had to be loosened and then retightened. Further, because the slotter heads were located at relatively inaccessible regions it was necessary to separate sections of the main frame of the apparatus in order to gain access to the slotter knife clamps and even under the best of conditions the operators had to work in relatively cramped spaces. When it becomes necessary to angularly adjust the slotter blades, four sets of slotter blades must be adjusted together with a set of blades for cutting the glue lap.

The prior art has attempted to provide means for simultaneously adjusting all of these sets of slotter blades from a single point by utilizing a very small diameter shaft driving a pinion engaging internal gears connected to the trailing slotter blades. The slotting or male blades must be maintained in close alignment to each other and very close tolerances are required between the male blades and the cooperating slot or female blade. Thus, there are very narrow spaces that often become packed with dust, grease, and other foreign material so that considerable torque is required to prevent binding of the slotter head. The adjusting shaft of the prior art construction is of too small a diameter to transmit sufficient adjusting torque when the narrow clearance spaces are jammed with foreign matter. The result is that the prior art construction requires excessive down-time for cleaning.

The instant invention provides means for simultaneously adjusting the angular positions of all slotter blades by utilizing controlled rotation of the main drive shaft. The latter is large enough to transmit large torque and is coupled directly to one blade on each of the slotter heads while the other blades are held at an indexing position. In the operating or cutting position of the slotter head, a spring operated clutch couples the slotter blades of each set together. For adjusting the slotter blades a pneumatic means is actuated to relax clutch pressure and to engage one of the slotter blades with the frame so that the slotter blade is at a predetermined angular indexing position and is maintained against rotation. Rotation of the drive shaft then moves the other slotter blade until there is a desired arcuate spacing between the slotter blades. Thereafter, the pneumatic means is deactuated and the spring clutch locks the slotter blades together for simultaneous operation.

Blade changing is facilitated by another pneumatic means which when actuated releases a clamping means that normally maintains the slotter blades in operating positions mounted to the head with a clamping action. There is direct contact of the blades with the head sections to achieve the close alignment required.

Accordingly, a primary object of the instant invention is to provide novel means for single point adjustment of slotter blades.

Another object is to provide adjusting means of this type in which adjustment takes place through rotation of the main drive shaft.

Still another object is to provide an adjusting means of this type in which the two slotter blades of each head are mounted on a common drive shaft and are maintained in driving relationship by a clutch.

A further object is to provide an adjusting means of this type having novel means to facilitate changing of the slotter blade.

A still further object is to provide an adjusting means of this type in which the slotter blades are clamped by a substantial force between two parts of the slotter head.

These objects as well as other objects of this invention shall become readily apparent after reading the following description of the accompanying drawings in which.

Figure 2:
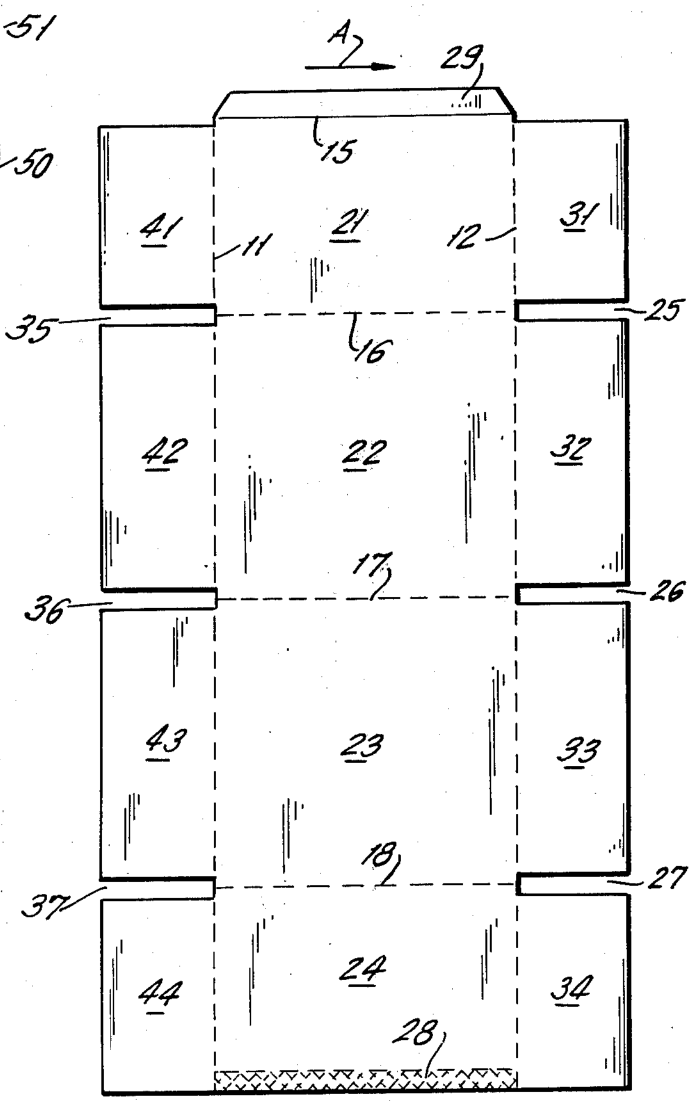
FIG. 2 is a plan view looking in the direction of arrows 2—2 of FIG. 1 showing the box blank of FIG. 1.

Now referring to the figures. FIG. 2 shows box blank 10 produced by passing a sheet of corrugated board (not shown) having transverse score lines 11, 12 through rotary slotter 14 and a rotary creaser (not shown). The latter makes longitudinal score lines 15–18 separating panels 21-24 from each other, crushes cross-hatched area 48 and crushes glue lap 29. Slotter 14 cuts slots 25–27 separating flaps 31–34 from one another, and slots 35–37 separating flaps 41–44 from each other, and also cuts glue lap 29. Each pair of longitudinally aligned slots, say 27–37, is cut by blades 38, 39 of rotary slotted head 45 keyed to main drive shaft 46 for rotation thereby.

As explained in detail in the aforesaid U.S. Pat. No. 2,982,189, transverse adjustment of head 45 (adjustment along the length of shaft 46) is made by rotating lead screw 47 threadably engaged with carrier 48 that is operatively engaged with head 45. Driven shaft 49, below and parallel to main shaft 46, has wheel 50 keyed thereto in operative position to support blank 10 from below during cutting by blades 38, 39. Wheel 50 is provided with peripheral anvil slot 51 constituting a female knife into which slotter blades 38, 39 extend during simultaneous rotation of head 45 and wheel 50. Rotation of head 45 and wheel 50 are in the directions indicated by the respective arrows B and C, and the direction of movement of blank 10 is indicated by arrow A.

It should now be apparent that blade 38 cuts leading edge slot 27 and blade 39 cuts trailing edge slot 37. It should also be apparent that an individual section consisting of head 45 and wheel 50 is provided to cut each of the other sets 25, 35, and 26, 36 of longitudinally aligned slots.

Figure 1:
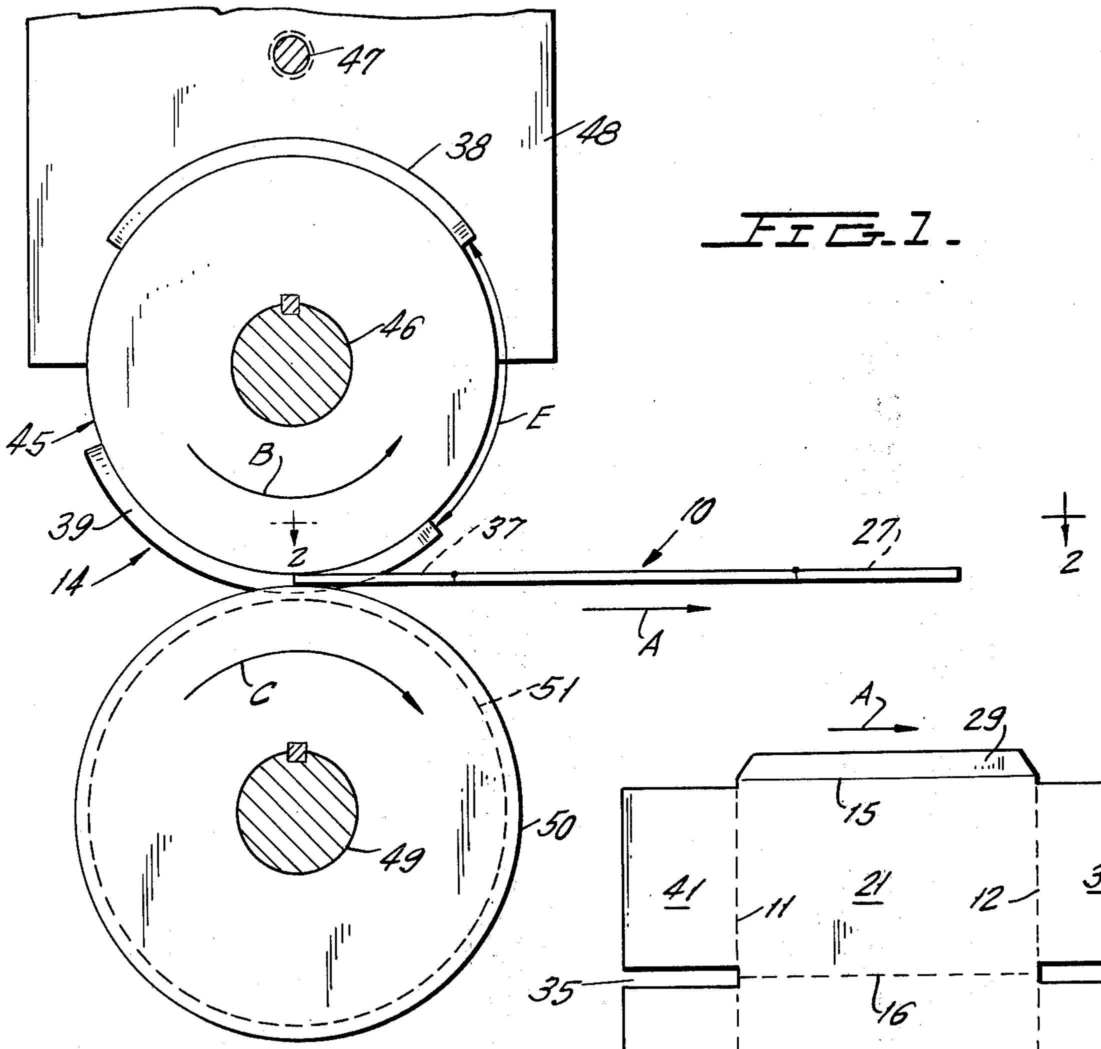
FIG. 1 is a schematic showing a side elevation of a slotter head just after it has operated to transform a sheet of corrugated board into a box blank.

Now referring more particularly to FIGS. 3 through 6 and, where feasible, utilizing those reference numerals previously utilized, detailed structure will be described to show how single point adjustment of all sets of slotter blades 38, 39 is obtained simultaneously. This adjustment sets the spacing indicated by the doubleheaded arrow E in FIG. 1, which corresponds to the distance between transverse score lines 11, 12 or length of each of the side panels 21–24.

Figure 3:
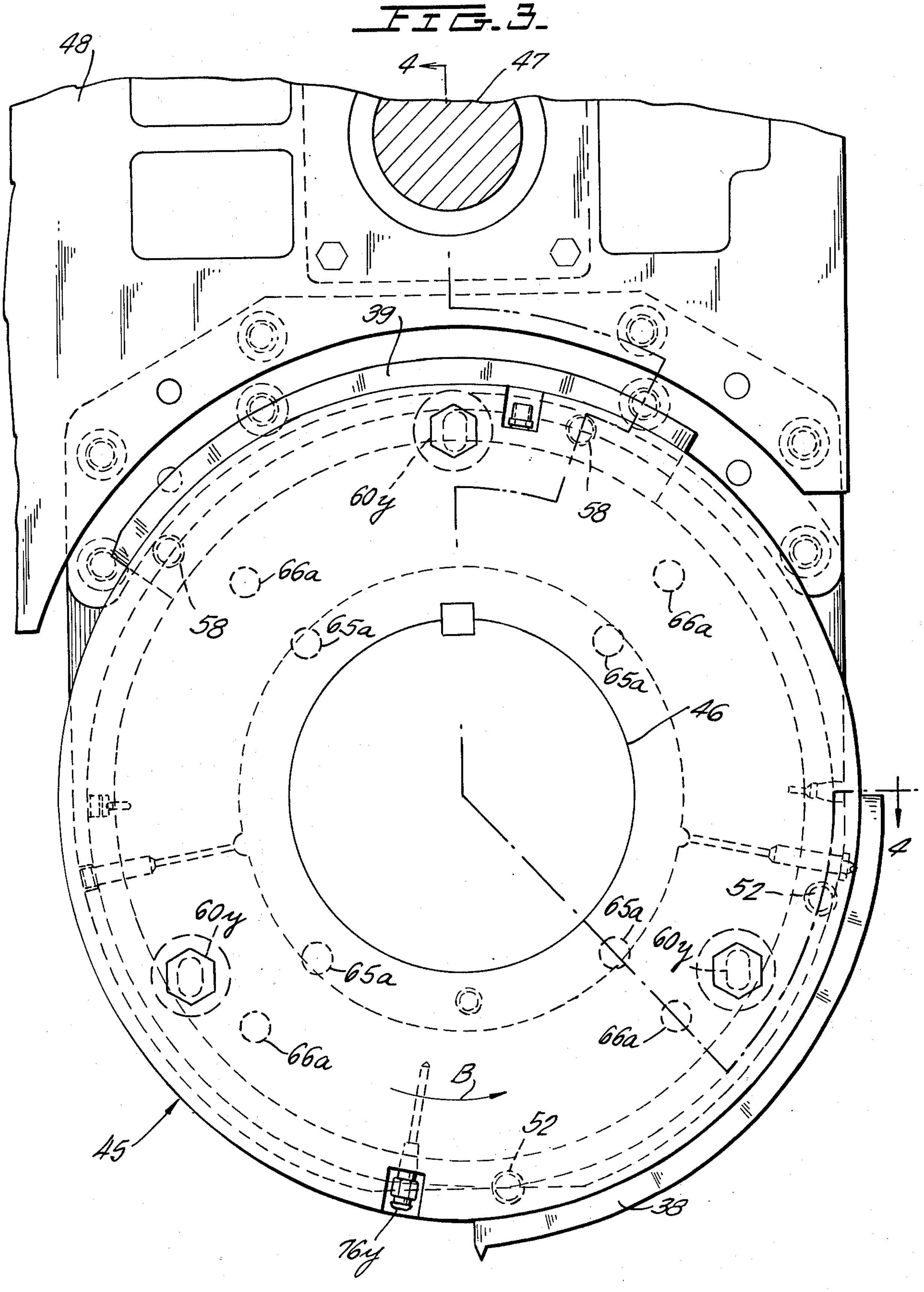
FIG. 3 is a side elevation of a slotter head constructed in accordance with teachings of the instant invention invention.

Slotter blade 38 is provided with two transverse protrusions in the form of pins 52, 52 that extend into circular recesses 53, 53 of head section 55 having central apperture 54 through which drive shaft 46 extends. Key 57 provides a permanent driving connection between shaft 46 and head section 55, yet permits the longitudinal position of head 45 along shaft 46 to be adjusted. Similarly, slotter blade 39 is provided with two transverse protrusions in the form of pins 58, 58 that extend into circular recesses 59, 59 of head section 56. Friction clutch elements 65 mounted to head section 55 are interleaved with clutch elements 66 mounted to head section 56. For a reason to be seen hereinafter, elements 65 are axially movable with respect to head section 55 yet are rotationally keyed thereto by keypins 65a (FIG. 3). Similarly, elements 66 are rotationally keyed to head section 56 by keypins 66a yet are axially movable with respect thereto.

Clutch elements 65, 66 are normally in driving engagement through the action of main springs 64 which bear against elements 55*a*, 55*b* with the latter transmitting the spring force to clutch elements 65, 66. Clutch elements 65, 66 in turn transmit this same spring force to head section 56, which transmits the force through slotter blades 38, 39 to head section 55, thereby normally clamping slotter blades 38, 39 between head sections 55 and 56.

Head 45 also includes non-rotatable section 60 secured to spacer 60*x*, and the latter is secured to carrier plate 48. Rotational movement of head section 55 relative to head section 60 takes place about bearings 61 which surround axially extending portion 55*c* of head section 55.

Head section 60, except for portions 60*g* and 60*x* thereof, are positioned radially by bearings 61 engaged by head portion 60*f*. The latter is secured to portion 60*g* by shoulder screws 60*y* extending through oversized apertures thereby permitting limited radial motion of head section 60, except for portions 60*g* and 60*x*, to take up shaft deflections.

In order to change the angular relationship between blades 38, 39, head 45 is stopped in an indexing position wherein axial protrusions 60*a* of stationary head section 60 are aligned with recesses 56*a* in extension 99 of the rightmost clutch element 66. Air under pressure is introduced at inlet 71 and flows into narrow space 72, thereby forcing piston 73 to the right with respect to FIG. 4. O-rings 92 and 93 provide working seals between piston 73 and portion 60*e* of stationary head section 60. Piston 74 is held against rotation by pins 73*b* extending therefrom to the right into recesses 73*y* in head section 60. Springs 89 preload thrust bearing 73*x* which supports piston 73 on ring 56*b*.

Figure 4:
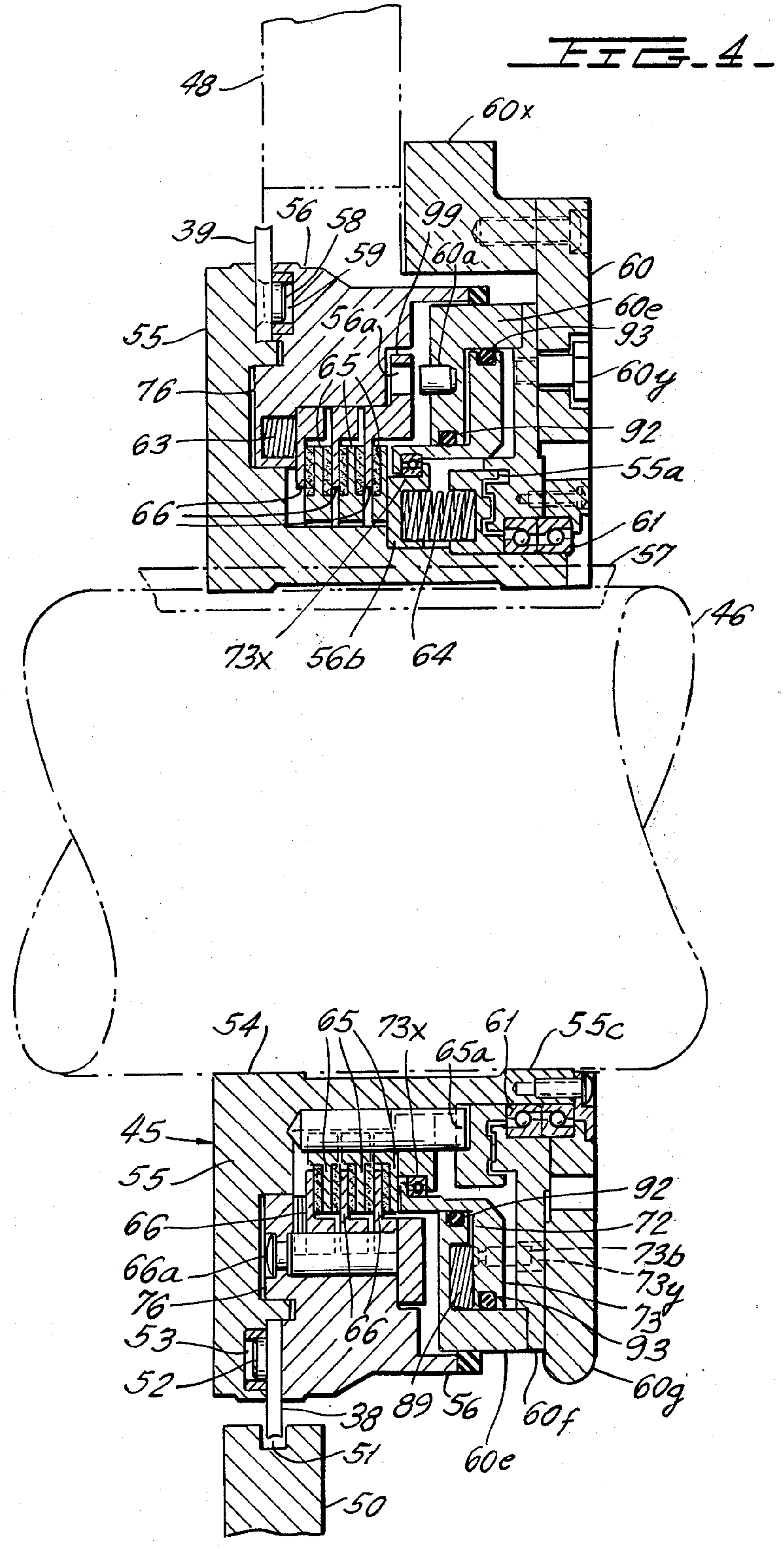
FIG. 4 is a cross-section taken through line 4—4 of FIG. 3 looking in the direction of arrows 4—4.

As piston 73 moves to the right, hooked end 73*a* thereof, acting through thrust bearing 73*x*, engages member 55*b*, 56*b*, moving it to the right with respect to FIG. 4. This action compresses main springs 64 so that clutch elements 65 and 66, with extension 99, are free to move to the right with respect to FIG. 4 under the influence of auxiliary springs 63. Now the elements are in the adjusting position of FIG. 5, with protrusions 60*a* entered into recesses 56a so that head section 56 cannot be rotated relative to head section 60, with the latter being held against rotation by carrier 48 and spacer 60*x*. However, at this time, head section 55 to which slotter blade 38 is mounted may be rotated by rotating main shaft 46 in that the force exerted by auxiliary spring 63 is low enough to permit slippage between clutch elements 65 and 66, between knife blade 39 and head section 55, and between knife blade 38 and head section 56. Thus, main shaft 46 is then rotated until the required space E (FIG. 1) is achieved between slotter blades 38 and 39.

It should now be apparent that when main shaft 46 is rotated to adjust blade position for one of the slotter heads, simultaneous adjustment of the other slotter heads will also take place since one section of each head is fixed against rotation at an indexing location and the other head section is keyed to drive shaft 46.

Figure 6:
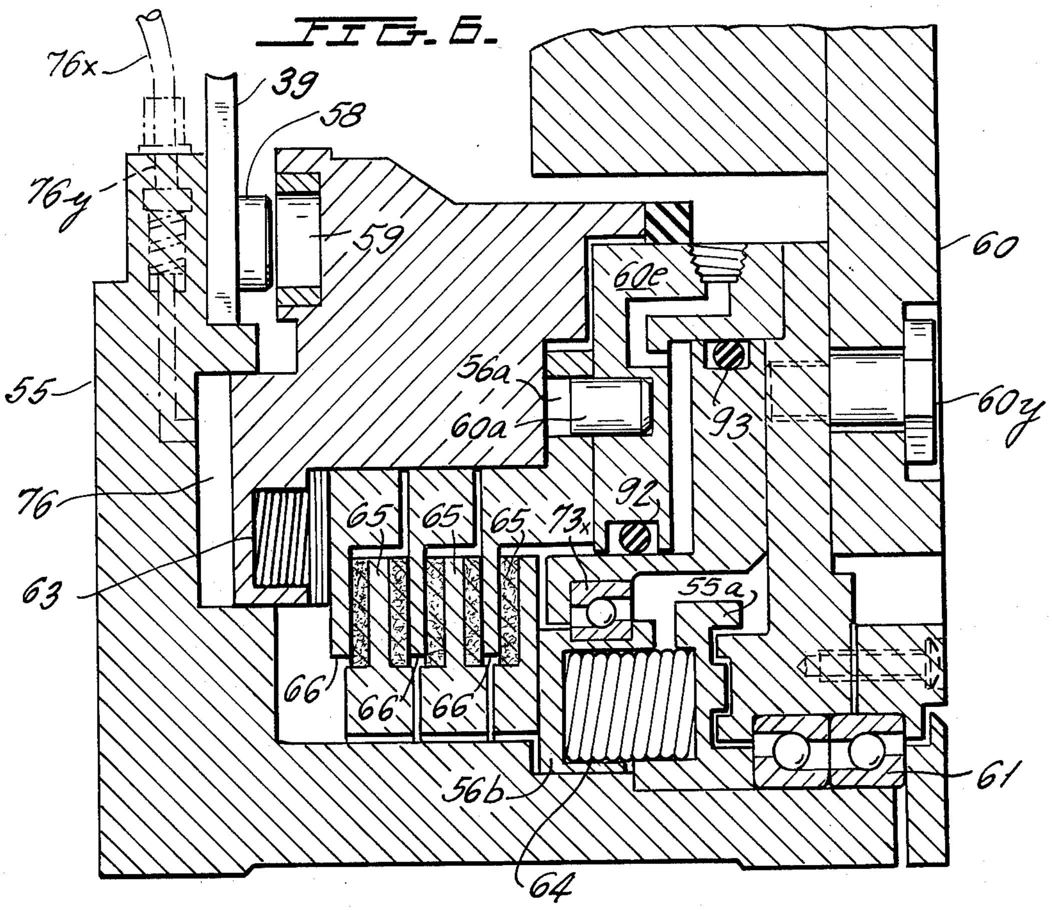
FIG. 6 is a fragmentary cross-section showing the elements of the slotter head in blade changing position.
Figure 5:
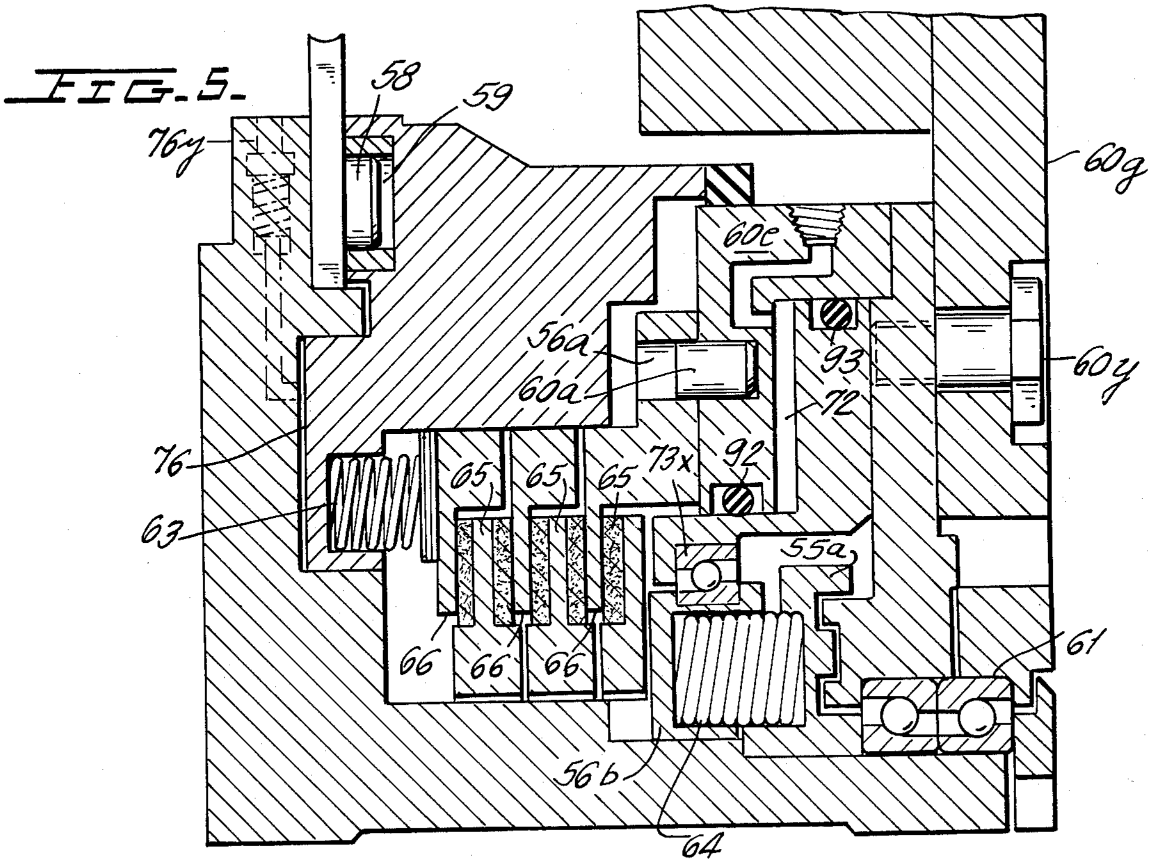
FIG. 5 is a fragmentary cross-section showing the elements of the slotter head in position for angular adjustment of the slotter blades.

With main spring 64 compressed as in FIG. 5, the application of air under pressure through air hose 76*x* and quick connect fitting 76*y* into narrow chamber 76 will compress auxiliary springs 63, thereby moving head section 56 to the right to the position indicated in FIG. 6. In this position of head section 56 blades 38, 39 are no longer clamped between head sections 55, 56, and there is a sufficient space between these elements, so that blade protrusions 52 and 58 are removable from recesses 53 and 59 so that blades 38 and 39 may be removed and replaced.

Thus, it is seen that the instant invention provides novel means whereby all slotter heads on a single drive shaft may be adjusted simultaneously through rotation of the drive shaft, and slotter blades may be changed merely by utilizing air pressure to release a clamping device.

Although there have been described preferred embodiments of this novel invention, many variations and modifications will now be apparent to those skilled in the art. Therefore, this invention is to be limited not by the specific disclosure here but only by the appending claims.

The embodiments of the invention in which an exclusive privilege or property is claimed are defined as follows:

1. Box making apparatus including a rotationally fixed frame section, a rotationally mounted drive shaft, a first head section keyed to said shaft for rotation thereby, first blade means operatively mounted to said first head section for rotation therewith, a second head section, a second blade means operatively mounted to said second head section for rotation therewith, operating means including a selectively operable clutch for making and breaking a direct driving connection between said first and second head sections, with said driving connection made said second head section being operatively connected to said first head section in a cutting position for rotation therewith, with said connection broken said second head section being operatively connected to said frame section against rotation whereby the angular position of said first blade means may be adjusted relative to said second blade means by rotating said shaft to rotate said first head section.

2. Box making apparatus as set forth in claim 1 in which the clutch is normally engaged to make said driving connection between said first and second head sections.

3. Box making apparatus as set forth in claim 2 in which the operating means includes a main spring means biasing said clutch to make said driving connection and fluid operated means to relax force exerted by said main spring means on said clutch to break said driving connection between said first and second head sections.

4. Box making apparatus as set forth in claim 3 in which there is an auxiliary spring means of much less strength than said main spring means to engage said clutch sufficiently for said drive shaft to rotate said second head section to an indexing position relative to said frame section when force exerted by said main spring means on said clutch is relaxed.

5. Box making apparatus as set forth in claim 1 also including another rotationally fixed frame section, a third head section keyed to said shaft for rotation thereby, said first and third sections being axially spaced along said shaft, third blade means operatively mounted to said third head section for rotation therewith, a fourth head section, a fourth blade means operatively mounted to said fourth head section for rotation therewith, another operating means including another selectively operable clutch for making and breaking another driving connection between said third and fourth head sections, with said another driving connection made, said fourth head section being operatively connected to said third head section in a cutting position for rotation therewith, with said another driving connection broken said fourth head section being operatively connected to said another frame section against rotation whereby the angular position of said third blade means may be adjusted relative to said fourth blade means by rotating said shaft to rotate said first and third head sections while said second and fourth head sections are both angularly fixed.

6. Box making apparatus as set forth in claim 4 also including holding means to maintain said second head section in said indexing position while said clutch slips to permit adjusting rotation of said main shaft and said first head section without rotating said second head section.

7. Box making apparatus as set forth in claim 6 in which the main spring means exerts a force biasing said second head section to clamp said first and second blade means between said first and second head sections when said second head section is in said running position.

8. Box making apparatus as set forth in claim 7 in which the auxiliary spring means normally exerts a force biasing said second head section to clamp said first and second blade means between said first and second head sections when force exerted by said main spring means on said second head section is relaxed.

9. Box making apparatus as set forth in claim 8 also including fluid operated means selectively operable against force exerted by said auxiliary spring means to unclamp said first and second blade means for removal thereof when said second head section is in said adjusting position.

10. Box making apparatus as set forth in claim 1 including biasing means normally urging said second head section toward said first head section to retain said first and second blade means in operative positions by clamping same between said head sections.

11. Box making apparatus as set forth in claim 1 in which the frame section is axially adjustable with respect to said drive shaft.

12. Box making apparatus as set forth in claim 2 in which the clutch is a friction device.

13. Box making apparatus as set forth in claim 6 in which the holding means comprises cooperating pin-recess means axially movable into engagement by said fluid operated means and biased away from engagement by said main spring means.

14. Box making apparatus including a rotationally fixed frame section, a rotationally mounted drive shaft, a first head section keyed to said shaft for rotation thereby, first blade means operatively mounted to said first head section for rotation therewith, a second head section, a second blade means operatively mounted to said second head section for rotation therewith, means mounting said second head section for rotation relative to said first head section to adjust relative positions of said first and second blade means, first means normally exerting a force clamping said first and second blade means between said first and second head sections, and second means for selectively relaxing said force to permit angular adjustment of said first and second blade means relative to each other, one of said first and second means being spring operated and the other of said first and second means being fluid operated.

* * * * *